(12) United States Patent
Lu et al.

(10) Patent No.: US 10,611,873 B2
(45) Date of Patent: Apr. 7, 2020

(54) POLYURETHANE PRESSURE-SENSITIVE ADHESIVES

(71) Applicant: 3M INNOVATIVE PROPERTIES COMPANY, St. Paul, MN (US)

(72) Inventors: Yongshang Lu, Woodbury, MN (US); Charlie Chia-Tie Ho, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/535,790

(22) PCT Filed: Dec. 4, 2015

(86) PCT No.: PCT/US2015/063853
§ 371 (c)(1),
(2) Date: Jun. 14, 2017

(87) PCT Pub. No.: WO2016/099937
PCT Pub. Date: Jun. 23, 2016

(65) Prior Publication Data
US 2017/0362374 A1    Dec. 21, 2017

Related U.S. Application Data

(60) Provisional application No. 62/092,337, filed on Dec. 16, 2014.

(51) Int. Cl.
*C08G 18/66* (2006.01)
*C09J 175/08* (2006.01)
*C09J 7/38* (2018.01)

(52) U.S. Cl.
CPC ..... *C08G 18/6666* (2013.01); *C08G 18/6674* (2013.01); *C08G 18/6677* (2013.01); *C09J 7/38* (2018.01); *C09J 175/08* (2013.01); *C08G 2170/40* (2013.01)

(58) Field of Classification Search
CPC ............ C08G 18/6666; C08G 18/6674; C08G 18/6677; C09J 175/08; C09J 7/38
See application file for complete search history.

(56) References Cited

U.S. PATENT DOCUMENTS

| | | | |
|---|---|---|---|
| 3,437,622 A | 4/1969 | Dahl | |
| 3,681,277 A | 8/1972 | Scholz | |
| 3,718,712 A | 2/1973 | Tushaus | |
| 3,761,307 A | 9/1973 | Dahl | |
| 3,925,283 A | 12/1975 | Dahl | |
| 3,930,102 A | 12/1975 | Muller | |
| 4,087,392 A | 5/1978 | Hartmann | |
| 4,626,475 A | 12/1986 | Goel | |
| 4,661,542 A | 4/1987 | Gilch | |
| 5,102,714 A | 4/1992 | Mobley | |
| 5,157,101 A | 10/1992 | Orr | |
| 5,227,409 A | 7/1993 | Mobley | |
| 5,554,686 A | 9/1996 | Frisch, Jr. | |
| 5,591,820 A | 1/1997 | Kydonieus | |
| 5,602,221 A | 2/1997 | Bennett | |
| 5,714,543 A | 2/1998 | Shah | |
| 5,773,490 A | 6/1998 | Shikinami | |
| 5,910,536 A | 6/1999 | Kydonieus | |
| 5,929,167 A | 7/1999 | Gerard | |
| 5,942,422 A | 8/1999 | Rothstein | |
| 6,518,359 B1 | 2/2003 | Clemens | |
| 6,630,050 B1* | 10/2003 | Moeller | B65C 9/22 156/331.7 |
| 6,642,304 B1 | 11/2003 | Hansen | |
| 6,726,971 B1 | 4/2004 | Wong | |
| 7,160,976 B2 | 1/2007 | Luhmann | |
| 2005/0137375 A1 | 6/2005 | Hansen | |
| 2008/0312386 A1 | 12/2008 | Nakamura | |
| 2009/0286950 A1* | 11/2009 | Schumann | C08G 18/0895 528/67 |
| 2011/0111221 A1 | 5/2011 | Schumann | |
| 2013/0017392 A1* | 1/2013 | Inao | C09J 7/38 428/336 |
| 2014/0017467 A1 | 1/2014 | Inao | |
| 2014/0127501 A1 | 5/2014 | Schumann | |
| 2014/0039123 A1 | 2/2016 | Iseki | |

FOREIGN PATENT DOCUMENTS

| | | |
|---|---|---|
| DE | 2435218 | 2/1975 |
| EP | 0196749 | 10/1993 |
| EP | 0979835 | 2/2000 |
| EP | 0597636 | 3/2000 |
| EP | 0958315 | 6/2001 |
| EP | 0882749 | 3/2004 |
| EP | 1088871 | 4/2005 |
| JP | 59-227922 | 12/1984 |
| JP | 63-189486 | 8/1988 |
| JP | 2000-073040 | 3/2000 |
| JP | 2000-256638 | 9/2000 |
| JP | 2000-256639 | 9/2000 |
| JP | 2000-328034 | 11/2000 |
| WO | WO 1997-022642 | 6/1997 |
| WO | WO 1998-031760 | 7/1998 |
| WO | WO 2001-062817 | 8/2001 |
| WO | WO 2010-132176 | 11/2010 |

OTHER PUBLICATIONS

Nakamura, "Adhesion Properties of Polyurethane Pressure-Sensitive Adhesive," Journal of Adhesion Science and Technology, vol. 27, No. 3, 2013, pp. 263-277.
International Search Report for PCT International Application No. PCT/US2015/063853, dated Mar. 9, 2016, 4 pages.
Majumdar, et al., "Physical characterization of polyethylene glycols by thermal analytical technique and the effect of humidity and molecular weight," Pharmazie, vol. 65, (2010), pp. 343-347.

* cited by examiner

*Primary Examiner* — Michael L Leonard
(74) *Attorney, Agent, or Firm* — Adrian L. Pishko

(57) ABSTRACT

A crosslinkable composition is provided including an asymmetric isocyanate, a polyether polyol, and a crosslinker. Polyurethane pressure-sensitive adhesives, articles, and solutions are also provided. The polyurethane pressure-sensitive adhesives have advantageous adhesive properties, low glass transition temperatures, and cohesion following thermal cycling.

14 Claims, No Drawings

POLYURETHANE PRESSURE-SENSITIVE ADHESIVES

CROSS REFERENCE TO RELATED APPLICATIONS

This application is a national stage filing under 35 U.S.C. 371 of PCT/US2015/063853, filed Dec. 4, 2015, which claims the benefit of U.S. Application No. 62/092337, filed Dec. 16, 2014, the disclosure of which is incorporated by reference in its/their entirety herein.

FIELD

The present disclosure relates to polyurethane pressure-sensitive adhesives.

BACKGROUND

Pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

Polyurethane PSAs have previously been made, for instance by adding tackifier resins and/or plasticizers to a polyurethane base polymer. Alternatively, polyurethane PSAs have been made by undercrosslinking of the polyurethane. Both of these methods result in PSAs having migratable components in the PSA. Polyurethanes have also been made via methods involving moisture curing or complex formulations.

There remains a need for PSAs based on chemically crosslinked polyurethanes, having advantageous adhesive properties, low glass transition temperatures, and cohesion following thermal cycling.

SUMMARY

Crosslinkable compositions, polyurethane pressure-sensitive adhesives, articles including pressure-sensitive adhesives, and composition solutions are provided. In a first aspect, a crosslinkable composition is provided. More particularly, a crosslinkable composition is provided including (a) 40 mole percent to 55 mole percent of an asymmetric isocyanate; (b) a polyether polyol; and (c) 5 mole percent to 40 mole percent of a crosslinker. The polyether polyol and the crosslinker are present in an amount of 45 mole percent to 60 mole percent of the total OH groups of the polyether polyol and the crosslinker together.

In a second aspect, a pressure-sensitive adhesive is provided. The pressure-sensitive adhesive includes a crosslinked composition according to the first aspect.

In a third aspect, an adhesive article is provided. The adhesive article includes an adhesive article including the crosslinked composition according to the first aspect, and a flexible backing layer.

In a fourth aspect, a solution is provided. The solution includes an organic solvent and the crosslinkable composition according to the first aspect.

The polyurethane pressure-sensitive adhesives provide, for example, improved adhesive shear modulus at low temperatures.

DETAILED DESCRIPTION

Crosslinkable compositions, polyurethane pressure-sensitive adhesives, articles, and composition solutions are provided.

The recitation of any numerical range by endpoints is meant to include the endpoints of the range, all numbers within the range, and any narrower range within the stated range (e.g. 1 to 5 includes 1, 1.5, 2, 2.75, 3, 3.8, 4, and 5). Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should be understood that, as used herein:

The term "a", "an", and "the" are used interchangeably with "at least one" to mean one or more of the elements being described.

The term "and/or" means either or both. For example, the expression "A and/or B" means A, B, or a combination of A and B.

The term "amorphous" refers to a lack of crystalline melt endothermic peak when measured by differential scanning calorimetry (DSC).

The term "mole percent" refers to the percent of total moles of crosslinkable components in a crosslinkable composition. Accordingly, any components (e.g., solvent, additives, etc.) that do not participate in a crosslinking reaction are not included in the determination of the total number of moles.

The term "mole percent of the OH groups" refers to the percent of total moles of OH groups in one or more components of a crosslinkable composition (as opposed to the total moles of components having OH groups, which could include different numbers of OH groups present per molecule of one component versus another component).

In a first aspect, a crosslinkable composition is provided, comprising:
  (a) 40 mole percent to 55 mole percent of an asymmetric isocyanate;
  (b) a polyether polyol; and
  (c) 5 mole percent to 40 mole percent of a crosslinker;
wherein the polyether polyol and the crosslinker are present in an amount of 45 mole percent to 60 mole percent of the total OH groups of the polyether polyol and the crosslinker together.

In a second aspect, a pressure-sensitive adhesive is provided, comprising the crosslinked composition according to the first aspect.

In a third aspect, an adhesive article is provided, comprising the crosslinked composition according to the first aspect, and a flexible backing layer.

In a fourth aspect, a solution is provided, comprising the crosslinkable composition according to the first aspect, and an organic solvent.

It has been discovered that polyurethane pressure-sensitive adhesives can be prepared that maintain their adhesive properties and appearance even after aging, and exhibit low adhesive shear moduli even at below zero (Celsius) temperatures. More particularly, the polyurethane pressure-sensitive adhesives are amorphous polymers. The components of the crosslinkable compositions are selected to form crosslinked compositions (i.e., the polymeric pressure-sensitive adhesives) that not only have an amorphous structure, but also maintain the amorphous structure over time and/or when exposed to a variety of conditions. Stated another way, the crosslinked compositions according to the present disclosure do not crystallize during polymerization, crosslinking, or in use.

A crosslinkable composition for forming a polyurethane pressure-sensitive adhesive includes at least one asymmetric isocyanate. In certain embodiments, the crosslinkable composition includes 45 mole percent to 50 mole percent of the isocyanate.

The asymmetry of the one or more isocyanates contributes to the amorphous structure of the resulting crosslinked polymer. Representative examples of suitable asymmetric isocyanates include for example and without limitation, 1-isocyanatomethyl-3-isocyanato-1,5,5-trimethylcyclohexane (isophorone diisocyanate), 1,3-bis(2-isocyanatopropan-2-yl)benzene (tetramethylxylene diisocyanate), 1-methyl-2,4-diisocyanatocyclohexane, 1,6-diisocyanato-2,2,4-trimethylhexane, 1,6-diisocyanato-2,4,4-trimethylhexane, 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-1-(4-isocyanatobut-1-yl)-1,3,3-trimethylcyclohexane, 1-isocyanato-2-(3-isocyanatoprop-1-yl)cyclohexane, 1-isocyanato-2-(2-isocyanatoeth-1-yl)cyclohexane, dicyclohexylmethane 2,4'-diisocyanate, 2-heptyl-3,4-bis(9-isocyanatononyl)-1-pentylcyclohexane, ethylethylene diisocyanate, and combinations thereof. Isophorone diisocyanate and/or tetramethylxylene diisocyanate may be preferred isocyanates in some embodiments. Isophorone diisocyanate, for instance, is commercially available under trade designation DESMODUR I from Bayer Corporation (Pittsburgh, Pa.).

In certain embodiments, the asymmetric isocyanate includes a chlorinated diisocyanate, a brominated diisocyanate, a sulphur-containing diisocyanate, a phosphorus-containing diisocyanate, or a combination thereof. One or more of these isocyanates may be combined with one or more of the above-identified isocyanates.

In certain embodiments, the crosslinkable composition includes 1.0 mole percent to 40 mole percent of the polyether polyol, or 1.0 mole percent to 30 mole percent, or 1 mole percent to 20 mole percent of the polyether polyol. The polyether polyol typically has an average molecular weight of about 1,000 grams/mole to 10,000 grams/mole, or about 1,000 grams/mole to 5,000 grams/mole, or about 1,000 grams/mole to 4,000 grams/mole, or about 2,000 grams/mole. One suitable polyether polyol is commercially available under trade designation VORANOL 220-056N from The Dow Chemical Company (Midland, Mich.).

As noted above, the polyether polyol and the crosslinker are present in an amount of 45 mole percent to 60 mole percent of the total OH groups of the polyether polyol and the crosslinker together. Stated another way, the amount of the combination of the polyether polyol and the crosslinker provides 45-60 percent of all the moles of hydroxyl groups in the crosslinkable composition, regardless of the number of hydroxyl groups present on each mole of each of the polyether polyol and the crosslinker. Hence, when the polyether polyol provides a large mole percent of OH groups, the crosslinker is selected to provide a small mole percent of OH groups, and vice versa; the specific polyether polyol and crosslinker can be varied to together provide the 45-50 mole percent of OH groups in the crosslinkable composition.

Typically, for the crosslinkable compositions of the present disclosure, the ratio of OH groups in the polyester polyol to NCO groups in the asymmetric isocyanate ranges from 0.80 to 1.25. This ratio can be used to determine a suitable amount of isocyanate within the range of 40 mole percent to 55 mole percent of an asymmetric isocyanate, and suitable amounts of polyester polyol and crosslinker within the range of 45 mole percent to 60 mole percent of the total OH groups of the polyether polyol and the crosslinker together. Too large of an amount of the isocyanate typically results in a PSA having high cohesive strength but low tack, while too small of an amount of the isocyanate typically results in a PSA having high tack but low cohesive strength. Too large of an amount of the crosslinker results in poor tack, while too small of an amount of the crosslinker results in low cohesive strength.

In some embodiments, the crosslinkable composition further includes a chain extender. The chain extender can be present in the crosslinkable composition in an amount of at least 1 mole percent, or at least 2 mole percent, or at least 5 mole percent, or at least 10 mole percent, or at least 15 mole percent, or even at least 20 mole percent; and in an amount of up to 40 mole percent, or up to 35 mole percent, or up to 30 mole percent, or up to 25 mole percent. For example, the chain extender can be present in the crosslinkable composition in an amount of 1 mole percent to 40 mole percent.

The chain extender typically has a molecular weight of about 400 grams per mole or less. The size of the chain extender is more important than the chemical structure. Without wishing to be bound by theory, it is believed that the relatively small size of the optional chain extender assists in forming an amorphous structure by helping to minimize or prevent the production of any crystalline structure of a resulting crosslinked composition. Representative examples of suitable chain extenders include 3-methyl-1,5-pentanediol, 1,4-butanediol, ethylene glycol, diethylene glycol, dipropylene glycol, neopentyl glycol, 1,6-hexanediol, 1,4-cyclohexane dimethanol, bis(2-hydroxylethyl)hydroquinone (HQEE), and combinations thereof. 3-Methyl-1,5-pentanediol (MPD), for instance, is commercially available from Tokyo Chemical Industry Co., Ltd. (Tokyo, Japan).

In embodiments in which a chain extender is included in the crosslinkable composition, typically the amount of crosslinker included is decreased as compared to embodiments without a chain extender present in the crosslinkable composition. When a chain extender is also present, the crosslinker is optionally present in an amount of 1 mole percent to 35 mole percent of the OH groups of the crosslinker, or 1 mole percent to 30 mole percent of the OH groups of the crosslinker, or 1 mole percent to 25 mole percent of the OH groups of the crosslinker.

The crosslinker has a hydroxyl functionality of higher than two, such as three OH groups, four OH groups, etc. Representative examples of suitable crosslinkers include 1,2,6-hexanetriol, glycerol, 1,1,1-trimethylolethane, 1,1,1-trimethylolpropane (TMP), pentaerythritol, triisopropanol amine, triethanol amine, a TMP initiated branched adipate polyol, a TMP initiated branched phthalate polyol, a glycerol initiated branched adipate polyol, and a glycerol initiated branched phthalate polyol. TMP, for instance, is commercially available as 3-ethyl-(hydroxymethyl)-1,3-propanediol from Alfa Aeser (Ward Hill, Mass.).

In certain embodiments, polyurethane polymers can be prepared by the reaction of a stoichiometric excess of polyol. In these embodiments, the OH terminal groups are typically further reacted with a multi-functional polyisocyanate. Suitable multi-functional polyisocyanates may include two or more isocyanate groups such as, for example, DESMODUR N-3300, DESMODUR N-3390, and DESMODUR N-3400, from Bayer AG (Leverkusen, Germany).

In certain embodiments, the crosslinkable composition further contains a catalyst. The optional catalyst is not particularly limited. Representative examples of suitable catalysts include stannous octoate, dibutyltin dilaurate, triethyl amine, bis(dimethylaminoethyl) ether, β,β'-dimorpholinodiethyl ether, a bismuth carboxylate, a zinc-bismuth carboxylate, iron(III) chloride, potassium octoate, or potassium acetate.

Other additives can be added in order to enhance the performance of the adhesive compositions. For example, one or more of ultraviolet light (UV) absorbers, radical scavengers, antioxidants, and the like, can be included herein. Such additives and the use thereof are well known in the art. It is understood that any of these compounds can be used so long as they do not deleteriously affect the adhesive properties. In contrast, the polyurethane pressure-sensitive adhesive is typically free of any added tackifiers or plasticizers.

Some representative examples of suitable UV absorbers include 5-trifluoromethyl-2-(2-hydroxy-3-alpha-cumyl-5-tert-octylphenyl)-2H-benzo-triazole, 2-(2-hydroxy-3,5-di-alpha-cumylphehyl)-2H-benzotriazole, 5-chloro-2-(2-hydroxy-3-tert-butyl-5-methylphenyl)-2H-benzotriazole, 5-chloro-2-(2-hydroxy-3,5-di-tert-butylphenyl)-2H-benzotriazole, 2-(2-hydroxy-3,5-di-tert-amylphenyl)-2H-benzotriazole, 2-(2-hydroxy-3-alpha-cumyl-5-tert-octylphenyl)-2H-benzotriazole, 2-(3-tert-butyl-2-hydroxy-5-methylphenyl)-5-chloro-2H-benzotriazole, 2(-4,6-diphenyl-1-3,5-triazin-2-yl)-5-hexcyloxy-phenol, and combinations thereof. Some representative examples of suitable radical scavengers include a hindered amine light stabilizer (HALS) compound and/or a hydroxylamine. One representative suitable antioxidant includes a hindered phenol.

A solution according to the present disclosure can include the crosslinkable composition as described above, and an organic solvent.

The polyurethane pressure-sensitive adhesives according to the present disclosure are prepared by a batch, continuous or semi-continuous polymerization process. The polymerization generally comprises the steps of:
(a) making a premix comprising
(i) an asymmetric isocyanate, and
(ii) a polyether polyol;
(b) concurrently agitating and heating the premix in an inert atmosphere to a temperature of about 50° C. to 100° C., and permitting polymerization of the isocyanate and polyether polyol;
(c) combining with the polymer a solution comprising
(iii) a crosslinker,
(iv) a solvent,
(v) optionally a chain extender,
(vi) optionally a catalyst,
(vii) optionally one or more additives;
(d) concurrently agitating and heating the polymer solution in an inert atmosphere to a temperature of about 50° C. to 100° C., and permitting crosslinking of the polyurethane polymer with the crosslinker and optional chain extender (if present) for a period of time, typically 2 to 4 hours, while the temperature is maintained. The mixture is then cooled to room temperature (about 23° C.) and the crosslinked composition is collected for evaluation.

In certain embodiments of a crosslinkable composition containing a UV absorber, the resulting pressure-sensitive adhesive formed after crosslinking includes the UV absorber covalently bonded to the adhesive. Such covalently bonded UV absorbers often include hydroxyl groups, which react with isocyanate molecules to end-cap the polymers with UV absorbers.

The above-described crosslinked compositions are coated on a substrate using conventional coating techniques modified as appropriate to the particular substrate. For example, these compositions can be applied to a variety of solid substrates, such as flexible backing materials, by methods such as roller coating, flow coating, dip coating, spin coating, spray coating knife coating, and die coating. These various methods of coating allow the compositions to be placed on the substrate at variable thicknesses thus allowing a wider range of use of the compositions. Coating thicknesses may vary, but coating thicknesses of 2-50 microns (dry thickness), preferably about 25 microns, are contemplated.

The flexible backing material may be any material conventionally utilized as a tape backing, optical film or any other flexible material. Typical examples of flexible backing materials employed as conventional tape backing that may be useful for the adhesive compositions include those made of paper, plastic films such as polyurethane, polypropylene, polyethylene, polyvinyl chloride, polyester (e.g., polyethylene terephthalate), cellulose acetate, polylactic acid, and ethyl cellulose.

Backings may also be prepared of fabric such as woven fabric formed of threads of synthetic or natural materials such as cotton, nylon, rayon, glass, ceramic materials, and the like or nonwoven fabric such as air laid webs of natural or synthetic fibers or blends of these. The backing may also be formed of metal, metallized polymer films, or ceramic sheet materials may take the form of any article conventionally known to be utilized with pressure-sensitive adhesive compositions such as labels, tapes, signs, covers, marking indicia, and the like.

Examples of materials that can be included in the flexible support include polyurethane, polyolefins such as polyethylene, polypropylene (including isotactic polypropylene), polystyrene, polyester, polyvinyl alcohol, poly(ethylene terephthalate), poly(butylene terephthalate), poly(caprolactam), poly(vinylidene fluoride), and the like. Commercially available backing materials useful in the invention include kraft paper (available from Monadnock Paper, Inc.); cellophane (available from Flexel Corp.); spun-bond poly(ethylene) and poly(propylene), such as TYVEK and TYPAR (available from DuPont, Inc.); and porous films obtained from poly(ethylene) and poly(propylene), such as TESLIN (available from PPG Industries, Inc.), and CELLGUARD (available from Hoechst-Celanese).

Additional examples of materials that can be included as the flexible support include foams, for instance foamed polymer films. Suitable foamed polymer films include polyolefin-based foamed films, such as the polyolefin foams VOLTEXTRA and VOLARA produced by Voltek Division of Sekisui America Corporation (Secaucus, N.J.). The foam may be formed as a coextruded sheet with the adhesive on one or both sides of the foam, or the adhesive may be laminated to it. When the adhesive is laminated to a foam, it may be desirable to treat the surface to improve the adhesion of the adhesive to the foam or to any of the other types of backings. Such treatments are typically selected based on the nature of the materials of the adhesive and of the foam or backing and include primers and surface modifications (e.g., corona treatment, surface abrasion). Additional suitable tape constructions include those described in U.S. Pat. No. 5,602,221 (Bennett et al.).

The flexible support may also comprise a release-coated substrate, such as a release liner. Such substrates are typically employed when an adhesive transfer tape is provided. Examples of release-coated substrates are well known in the art. They include, by way of example, silicone-coated kraft paper and the like. Tapes of the invention may also incorporate a low adhesion backsize (LAB). Typically this LAB is applied to the tape backing surface that is opposite that bearing the pressure-sensitive adhesive. LABs are known in the art.

The pressure-sensitive adhesives can be used in a variety of traditional pressure-sensitive adhesive articles, such as tapes, labels, decals, transfer tapes and other articles. For instance, polyurethane pressure-sensitive adhesives can be employed for masking tapes, packaging tapes, transfer tapes, foam tapes, medical tapes, and microstructured tapes.

While the adhesives of the present invention may be suited for use in wet lamination applications, the adhesives may also perform well in dry lamination applications, wherein the resultant lamination is subjected to high heat and humidity conditions. To begin, pressure-sensitive adhesive is coated onto backings with the desired coating thickness and then dried before lamination. Then, water is sprayed onto glass or other substrate, sometimes along with a small amount of surfactant to lower the water's surface tension, to obtain a thin water layer on the substrate surface. The film is then positioned properly on the substrate, and most of the excess of water is squeezed out to yield a substrate/PSA/film laminate. The remaining water in the laminate will be evaporated in a few days, depending on the materials used in the laminate.

For dry lamination, a PSA is coated onto films (backings) with the desired coating thickness, and then dried before lamination. Such PSA coated film is then adhered onto substrate surface with pressure and/or high temperature to bond the film onto the substrate surface.

Polyurethane pressure-sensitive adhesives (e.g., crosslinked compositions) may thus be formed via simple reaction methods. Due to the reaction mechanism of polyurethane not proceeding via free radical polymerization, there are few or no residual unreacted components left in the polyurethane PSAs. This is advantageous because, in contrast to the polyurethane PSAs according to the present disclosure, residual monomers (when present in other PSAs) are often capable of migrating out of a polymer and causing cosmetic issues or even hygiene or toxicity issues.

An advantage of the pressure-sensitive adhesives of the present disclosure includes their desirable visual appearance. For instance, the adhesive usually has a haze of less than 2% or even less than 1.5%. The pressure-sensitive adhesives of the present disclosure also exhibit low glass transition temperatures of below zero degrees Celsius (0° C.), such as below −30° C., or below −35° C., or below −40° C., or even below −45° C. In many embodiments, the pressure-sensitive adhesives an adhesive shear modulus at −25° C. of $0.1 \times 10^7$ dyne/cm$^2$ to $20 \times 10^7$ dyne/cm$^2$, or $0.1 \times 10^7$ dyne/cm$^2$ to $10 \times 10^7$ dyne/cm$^2$, or $0.1 \times 10^7$ dyne/cm$^2$ to $5 \times 10^7$ dyne/cm$^2$, or less than $5 \times 10^7$ dyne/cm$^2$, or less than $1 \times 10^7$ dyne/cm$^2$. Such adhesive shear moduli at −25° C. allow the polyurethane pressure-sensitive adhesives to still exhibit pressure-sensitive adhesive properties when the use temperature is as low as about −35° C. to −40° C.

Various items are described that are crosslinkable compositions, pressure-sensitive adhesives, articles, or solutions.

Embodiment 1 is a crosslinkable composition including (a) 40 mole percent to 55 mole percent of an asymmetric isocyanate; (b) a polyether polyol; and (c) 5 mole percent to 40 mole percent of a crosslinker. The polyether polyol and the crosslinker are present in an amount of 45 mole percent to 60 mole percent of the total OH groups of the polyether polyol and the crosslinker together.

Embodiment 2 is the crosslinkable composition of embodiment 1, wherein the isocyanate includes 1-isocyanatomethyl-3-isocyanato-1,5,5-trimethylcyclohexane (isophorone diisocyanate), 1,3-bis(2-isocyanatopropan-2-yl)benzene (tetramethylxylene diisocyanate), 1-methyl-2,4-diisocyanatocyclohexane, 1,6-diisocyanato-2,2,4-trimethylhexane, 1,6-diisocyanato-2,4,4-trimethylhexane, 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-1-(4-isocyanatobut-1-yl)-1,3,3-trimethylcyclohexane, 1-isocyanato-2-(3-isocyanatoprop-1-yl)cyclohexane, 1-isocyanato-2-(2-isocyanatoeth-1-yl)cyclohexane, dicyclohexylmethane 2,4'-diisocyanate, 2-heptyl-3,4-bis(9-isocyanatononyl)-1-pentylcyclohexane, ethylethylene diisocyanate, or a combination thereof.

Embodiment 3 is the crosslinkable composition of embodiment 1 or embodiment 2, wherein the isocyanate includes a chlorinated diisocyanate, a brominated diisocyanate, a sulphur-containing diisocyanate, a phosphorus-containing diisocyanate, or a combination thereof.

Embodiment 4 is the crosslinkable composition of embodiment 1 or embodiment 2, wherein the isocyanate includes isophorone diisocyanate, tetramethylxylene diisocyanate, or a combination thereof.

Embodiment 5 is the crosslinkable composition of any of embodiments 1 to 4, further including 1 mole percent to 40 mole percent of a chain extender.

Embodiment 6 is the crosslinkable composition of embodiment 5, wherein the chain extender includes 3-methyl-1,5-pentanediol, 1,4-butanediol, ethylene glycol, diethylene glycol, dipropylene glycol, neopentyl glycol, 1,6-hexanediol, 1,4-cyclohexane dimethanol, bis(2-hydroxylethyl)hydroquinone (HQEE), or a combination thereof.

Embodiment 7 is the crosslinkable composition of embodiment 5 or embodiment 6, wherein the chain extender includes 3-methyl-1,5-pentanediol.

Embodiment 8 is the crosslinkable composition of any of embodiments 5 to 7, wherein the crosslinker is present in an amount of 1 mole percent to 35 mole percent of the OH groups of the crosslinker.

Embodiment 9 is the crosslinkable composition of any of embodiments 1 to 8, wherein the crosslinker includes 1,2,6-hexanetriol, glycerol, 1,1,1-trimethylolethane, 1,1,1-trimethylolpropane (TMP), pentaerythritol, triisopropanol amine, triethanol amine, a TMP initiated branched adipate polyol, a TMP initiated branched phthalate polyol, a glycerol initiated branched adipate polyol, or a glycerol initiated branched phthalate polyol.

Embodiment 10 is the crosslinkable composition of any of embodiments 1 to 9, wherein the crosslinker includes TMP.

Embodiment 11 is the crosslinkable composition of any of embodiments 1 to 10, further including a catalyst.

Embodiment 12 is the crosslinkable composition of embodiment 11, wherein the catalyst includes stannous octoate, dibutyltin dilaurate, triethyl amine, bis(dimethylaminoethyl) ether, β,β'-dimorpholinodiethyl ether, a bismuth carboxylate, a zinc-bismuth carboxylate, iron(III) chloride, potassium octoate, or potassium acetate.

Embodiment 13 is the crosslinkable composition of any of embodiments 1 to 12, further including a UV absorber, a radical scavenger, an antioxidant, or a combination thereof.

Embodiment 14 is the crosslinkable composition of embodiment 13, wherein the UV absorber includes 5-trifluoromethyl-2-(2-hydroxy-3-alpha-cumyl-5-tert-octylphenyl)-2H-benzo-triazole, 2-(2-hydroxy-3,5-di-alpha-cumylphehyl)-2H-benzotriazole, 5-chloro-2-(2-hydroxy-3-tert-butyl-5-methylphenyl)-2H-benzotiazole, 5-chloro-2-(2-hydroxy-3,5-di-tert-butylphenyl)-2H-benzotriazole, 2-(2-hydroxy-3,5-di-tert-amylphenyl)-2H-benzotriazole, 2-(2-hydroxy-3-alpha-cumyl-5-tert-octylphenyl)-2H-benzotriazole, 2-(3-tert-butyl-2-hydroxy-5-methylphenyl)-5-chloro-2H-benzotriazole, 2(-4,6-diphenyl-1-3,5-triazin-2-yl)-5-hexcyloxy-phenol, or a combination thereof.

Embodiment 15 is the crosslinkable composition of embodiment 13, wherein the radical scavenger includes a hindered amine light stabilizer (HALS) compound, a hydroxylamine, or a combination thereof.

Embodiment 16 is the crosslinkable composition of embodiment 13, wherein the antioxidant includes a hindered phenol.

Embodiment 17 is the crosslinkable composition of any of embodiments 1 to 16, including 45 mole percent to 50 mole percent of the isocyanate.

Embodiment 18 is the crosslinkable composition of any of embodiments 1 to 17, comprising 1.0 mole percent to 40 mole percent of the polyether polyol.

Embodiment 19 is the crosslinkable composition of any of embodiments 1 to 18, wherein the polyether polyol has an average molecular weight of about 1,000 grams/mole to 5,000 grams/mole.

Embodiment 20 is a pressure-sensitive adhesive comprising the crosslinked composition of any of embodiments 1 to 19.

Embodiment 21 is the pressure-sensitive adhesive of embodiment 20, wherein the crosslinked composition has an amorphous structure.

Embodiment 22 is the pressure-sensitive adhesive of embodiment 20 or embodiment 21, further including a catalyst.

Embodiment 23 is the pressure-sensitive adhesive of any of embodiments 20 to 22, further including a UV absorber, a radical scavenger, an antioxidant, or a combination thereof.

Embodiment 24 is the pressure-sensitive adhesive of embodiment 23, wherein the UV absorber is covalently bonded to the adhesive.

Embodiment 25 is the pressure-sensitive adhesive of any of embodiments 20 to 24, wherein the adhesive has a haze of less than 2%.

Embodiment 26 is the pressure-sensitive adhesive of any of embodiments 20 to 25, wherein the adhesive has a haze of less than 1.5%.

Embodiment 27 is the pressure-sensitive adhesive of any of embodiments 20 to 26, wherein the adhesive has an adhesive shear modulus at $-25°$ C. of $0.1 \times 10^7$ dyne/cm$^2$ to $20 \times 10^7$ dyne/cm$^2$.

Embodiment 28 is an adhesive article including the crosslinked composition of any of embodiments 1 to 19 and a flexible backing layer.

Embodiment 29 is the adhesive article of embodiment 28 wherein the flexible backing layer includes a polyurethane film.

Embodiment 30 is a solution including the crosslinkable composition of any of embodiments 1 to 19 and an organic solvent.

This invention is further illustrated by the following examples that are not intended to limit the scope of the invention. In the examples, all parts, ratios and percentages are by weight unless otherwise indicated. The following test methods were used to evaluate and characterize the emulsion PSAs produced in the examples. All materials are commercially available, for example from Aldrich Chemicals, unless otherwise indicated or described.

EXAMPLES

Objects and advantages of this invention are further illustrated by the following examples, but the particular materials and amounts thereof recited in these examples, as well as other conditions and details, should not be construed to unduly limit this invention. These examples are for illustrative purposes only and are not meant to be limiting on the scope of the appended claims.

Materials

Unless otherwise noted, all parts, percentages, ratios, etc., in the examples and in the remainder of the specification are by weight. Unless otherwise noted, all chemicals are available from chemical suppliers such as Sigma-Aldrich Chemical Company, St. Louis, Mo.

TABLE 1

Materials

| CHEMICAL | DESCRIPTION | SOURCE |
| --- | --- | --- |
| VORANOL 220-056N | Polyether polyol Mw = 2000 | Dow Chemical Company, Midland, MI |
| "IPDI" | Isophorone diisocyanate, under the trade designation "DESMODUR I" | Bayer Corporation, Pittsburgh, PA |
| "TMP" | 2-Ethyl-(hydroxymethyl)-1,3-propanediol | Alfa Aesar, Ward Hill, MA |
| "MPD" | 3-Methyl-1,5-pentanediol | TCI, Tokyo, Japan |
| "MEK" | Methyl ethyl ketone, solvent | Avantor Performance Materials, Inc., Center Valley, PA |
| "DBTDA" | Dibutyltin diacetate, catalyst | Sigma-Aldrich, St. Louis, MO |
| 3M Polyurethane Film | A clear coated extruded 6 mil (~152 micrometers) thermoplastic polyurethane film on a 2 mil (50.8 micrometers) polyester carrier web without adhesive. | 3M Automotive Division, St. Paul, MN |

TABLE 1-continued

Materials

| CHEMICAL | DESCRIPTION | SOURCE |
|---|---|---|
| 8014 paint panel | A standard automotive base coat/ clear coat and white paint painted steel panel, available under the trade name number of 8014. | ACT, Hillsdale, MI |

Test Methods

Measurement of Glass Transition Temperatures (Tg) and Adhesive Shear Moduli (G')

The rheological properties of polyurethane adhesive was measured using an ARES G2 RHEOMETER. TA Instrument. G' (shear modulus) and glass transition were measured from −50° C. to 150° C. and strain amplitude and frequency were set was at 0.1%-5% and 6.28 rad/sec respectively.

Gravel Test

The test was conducted according to test method SAE J400. The film samples were applied on standard clear coated white painted 8014 panel and conditioned at −30° C. for 24 hours. The sample was taken out of the freezer and hit with 1 pint of gravel particles at 60 psi (414 kPa) pressure. The samples shall show no delamination or chip through the film.

Gloss 60°

Films were applied on a standard clear coated white painted 8014 panel. 60 degree gloss was measured and values were reported as gloss units.

Initial Color

Films were applied on standard clear coated white painted 8014 panel. The initial color was measured by reading film on metal panel vs. metal panel using a standard MODEL i5D Colorimeter (available from X-Rite, Grand Rapids, Mich., USA). The initial color ΔE, ΔL, Δa, and Δb were reported.

Haze Value

Films were applied on 4 mil (~102 micrometers) clear polyester terephthalate sheet. Haze was measure by a HAZEGARD instrument available from BYK Gardner, Columbia, Md., with results reported as percent haze.

Solvent Resistance Tests

Film samples were applied on a standard 8014 clear coated white painted panel and then conditioned for 24 hours. The samples (on the panels) were individually immersed in kerosene, window washer, and gasoline for 30 minutes. The samples were wiped clean and inspected. In order to receive a value of "Pass", the samples shall show no significant discoloration, blistering, cloudiness, film edge lifting or wrinkling resulting from adhesive failure due to solvent attack.

Environmental Aging Tests 1. 7 Day Heat Aging Test—Film samples were applied on a standard 8014 clear coated white painted panel and then conditioned for 24 hours by setting it at room temperature before placement into an 80° C. oven for 7 days and 14 days individually. The standard Colorimeter from X-Rite MODEL i5D (from Grand Rapids, Mich., USA) was used to measure the color change of the exposed film on panel. The color change ΔE, ΔL, Δa, and Δb were reported.
2. 7 Day Water Immersion at 40° C.—Film samples were applied on a standard 8014 clear coated painted white panel and then conditioned 24 hours before placement into the water bath for 7 days. The standard Colorimeter from X-Rite MODEL i5D (from Grand Rapids, Mich., USA) was used to measure the color change of the exposed film on panel. The color change ΔE, ΔL, Δa, and Δb were reported.
3. 7 Day 100/100 Humidity Condensing—Film samples were applied on a standard 8014 clear coated painted white panel and then conditioned 24 hours before placement into the 100° F. (38° C.)/100% humidity condensing chamber for 7 days. The standard Colorimeter from X-Rite MODEL i5D (from Grand Rapids, Mich., USA) was used to measure the color change of the exposed film on panel. The color change ΔE, ΔL, Δa, and Δb were reported.
4. Thermal Cycle—Film samples were applied on a standard 8014 clear coated painted white panel and then conditioned 24 hours before placement into a computer programmed THERMOTRON (from Holland, Mich., USA). The thermal cycle was pre-programmed is summarized below. A total of 3 cycles were tested. The standard Colorimeter from X-Rite MODEL i5D (from Grand Rapids, Mich., USA) was used to measure the color change of the exposed film on panel. The color change ΔE, ΔL, Δa, and Δb were reported.
    a. −30° C. for 7.5 hours
    b. 25° C. for 0.5 hours
    c. 80° C. for 15.5 hours
    d. 25° C. for 0.5 hours
    e. −30° C. for 7.5 hours
    f. 25° C. for 0.5 hours
    g. 50° C. at 95% humidity for 15.5 hours
    h. 25° C. for 0.5 hours 180 Degree Peel Adhesion Test Film samples were cut into 10 millimeter wide stripes. Standard 8014 clear coated panel was cleaned with isopropyl alcohol. The film strips were released from the line and sprayed with an isopropyl alcohol/water (75/25 w/w) mixture. The film strips were then applied on the 8014 panel using a roller that provided 5 Newton force at 50 millimeter per second. The "Visual Appearance after IPA/water wet application" was then noted, with an indication of "Pass" if no blistering or bubbles were observed by visual inspection.

The 180 degree peel adhesion of the applied film strips were then measured at the conditions summarized as follows. The peel adhesion was conducted at 30 centimeters per minute.

The 180 degree peel adhesion values were reported in Newton per meter (N/m).

Initial State—Aged 30 minute at 25° C.

Normal State—Aged 24 hour at 2° C.

Room Temperature (RT) Aged—aged 168 hours at 25° C.

Low Temperature Normal State—Aged 168 hours at −30° C., and then conditioned 24 hours at room temperature before conducting the peel test.

After 100/100 Humidity—Aged in 100° F. (~38° C.) and 100% humidity condensing chamber for 168 hours. The sample was conditioned 24 hours at room temperature before conducting peel test.

After Heat Aged—Aged in 80° C. for 168 hours. The sample was conditioned 24 hours at room temperature before conducting peel test.

After Water Immersion—Immersed in 40° C. water bath for 168 hours. The sample was conditioned 24 hours at room temperature before conducting peel test.

Example 1 (EX-1)

IPDI (4.33 grams) and VORANOL 220-056N (30.0 grams) were added to a three-necked flask equipped with a mechanical stirrer, nitrogen inlet and condenser. The reaction was carried out at 78° C. for 1 hour under a dry nitrogen atmosphere, and 0.40 grams of TMP and 70 grams of MEK were added to the system for the slightly crosslinking reaction. After an additional 2 hours of reaction, the viscous polyurethane solution in MEK was cooled down to room temperature to obtain 33 wt. % solids. The polyurethane adhesive solution was a clear, transparent white liquid.

The polyurethane adhesive solution was coated on a siliconized polyester liner at 7 mil (~180 micrometers) wet thickness and dried and cured in air circulated ovens, one minute in 135° F. (~57° C.), one minute in 165° F. (~74° C.), and one minute in 235° F. (~113° C.). The polyurethane adhesive had a Tg at −48° C. The moduli of the cured adhesive was tested at various temperatures, with the results as summarized in Table 3.

The polyurethane adhesive was laminated to 3M polyurethane film at 45 psi (~310 kPa) at 10 feet per minute (~3.0 meters per minute). The resulting film was tested with results as summarized in Tables 4-9. No cohesive failure, discoloration, or other failure modes were seen.

Example 2 (EX-2)

IPDI (4.50 grams) and VORANOL 220-056N (30.0 grams) were added to a three-necked flask equipped with a mechanical stirrer, nitrogen inlet and condenser. The reaction was carried out at 78° C. for 1 hour under a dry nitrogen atmosphere, and the 0.46 gram of TMP and 70 grams of MEK were added to the system for the crosslinking reaction. After an additional 2 hours of reaction, the viscous polyurethane solution in MEK was cooled down to room temperature to obtain 33 wt. % solids. The polyurethane adhesive solution was a clear, transparent white liquid.

The polyurethane adhesive was coated and cured the same ways as described in Example 1. The rheological properties were also measured the same ways as described in Example 1. The polyurethane adhesive had a Tg at −47.7° C. The shear moduli (G') of adhesive at various temperatures are summarized in Table 3.

The polyurethane adhesive was laminated to 3M polyurethane film at 45 psi (~310 kPa) at 10 feet per minute (~3.0 meters per minute). The resulting film was tested as summarized in Tables 4-9. No cohesive failure, discoloration, or other failure modes were seen.

Example 3 (EX-3)

IPDI (7.33 grams), VORANOL 220-056N (30.0 grams) and MPD (1.77 grams) were added to a three-necked flask equipped with a mechanical stirrer, nitrogen inlet and condenser. The reaction was carried out at 78° C. for 1 hour under a dry nitrogen atmosphere, and 0.26 gram of TMP and 70 grams of MEK were added to the system for the slightly crosslinking reaction. After an additional 2 hours of reaction, the viscous polyurethane solution in MEK was cooled down to room temperature to obtain 33 wt. % solids. The polyurethane adhesive solution was a clear, transparent white liquid.

The polyurethane adhesive was coated and cured the same ways as described in Example 1. The rheological properties were also measured the same ways as described in Example 1. The polyurethane adhesive showed a Tg at −39.4° C. The shear moduli (G') of adhesive at various temperatures are summarized in Table 3.

The polyurethane adhesive was laminated to 3M polyurethane film at 45 psi (~310 kPa) at 10 feet per minute (~3.0 meters per minute). The resulting film was tested as summarized in Tables 4-9. No cohesive failure, discoloration, or other failure modes were seen.

Example 4 (EX-4)

IPDI (8.53 grams). VORANOL 220-056N (30.0 grams) and MPD (2.34 grams) were added to a three-necked flask equipped with a mechanical stirrer, nitrogen inlet and condenser. The reaction was carried out at 78° C. for 1 hour under a dry nitrogen atmosphere, and 0.35 gram of TMP and 80 grams of MEK were added to the system for the slightly crosslinking reaction. After an additional 2 hours of reaction, the viscous polyurethane solution in MEK was cooled down to room temperature to obtain 33 wt. % solids. The polyurethane adhesive solution was clear, transparent white liquid.

The polyurethane adhesive was coated and cured the same ways as described in Example 1. The rheological properties were also measured the same ways as described in Example 1. The polyurethane adhesive showed a Tg at −33.4° C. The shear moduli (G') of adhesive at various temperatures are summarized in Table 3.

The polyurethane adhesive was laminated to 3M polyurethane film at 45 psi at 10 feet per minute. The resulting film was tested as summarized in Tables 4-9. No cohesive failure, discoloration, or other failure modes were seen.

Example 5 (EX-5)

Polyurethane with 5 Mole % Crosslinker

IPDI of 3.50 g, 30.0 gram VORANOL 220-056N, 10.0 g MEK and 0.01 g DBTDA were added to a three-necked flask equipped with a mechanical stirrer, nitrogen inlet and condenser. The reaction was carried out at 78° C. for 2 hour under a dry nitrogen atmosphere, and 0.067 gram of TMP and 58.0 g MEK were added to the system for the crosslinking. After an additional 3 hours of reaction, the viscous polyurethane solution in MEK was cooled down to room temperature to obtain 33% solid. The polyurethane adhesive solution was clear, transparent liquid. The polyurethane results in very sticky PSA.

Comparative Example 1 (CE-1)

Polyurethane with No Crosslinker

IPDI of 3.33 g, 30.0 gram VORANOL 220-056N, 10 g MEK were added to a three-necked flask equipped with a mechanical stirrer, nitrogen inlet and condenser. The reaction was carried out at 78° C. for 6 hours under a dry nitrogen atmosphere until the NCO group was disappeared determined by FT-IR. Then 57 g MEK were added to the system to obtain 33% solid solution. The polyurethane adhesive solution was clear, transparent liquid. The polyurethane results in very sticky adhesive after drying, but no desired strength for PSA application.

Comparative Example 2 (CE-2)

Polyurethane with 50 Mole % Crosslinker

IPDI of 5.0 g, 30.0 gram VORANOL 220-056N, 10.0 g MEK and 0.01 g DBTDA were added to a three-necked flask equipped with a mechanical stirrer, nitrogen inlet and condenser. The reaction was carried out at 78° C. for 1 hour under a dry nitrogen atmosphere, and 0.67 gram of TMP and 62 g MEK were added to the system for the crosslinking reaction. After an additional 2 hours of reaction, the polyurethane solution with a solid content of 33% in MEK became very viscous and gelled. The gelled polyurethane in MEK was dried at 75° C., resulting in a film having no tack.

Comparative Example 3 (CE-3)

Polyurethane with 50 Mole % Crosslinker

IPDI of 9.83 g, 30.0 gram VORANOL 220-056N, 2.30 g MPD, 10.0 g MEK and 0.01 g DBTDA were added to a three-necked flask equipped with a mechanical stirrer, nitrogen inlet and condenser. The reaction was carried out at 78° C. for 1 hour under a dry nitrogen atmosphere, and 0.87 gram of TMP and 77.3 g MEK were added to the system for the crosslinking. After an additional 2 hours of reaction, the polyurethane solution with a solid content of 33% in MEK became very viscous and gelled. The gelled polyurethane in MEK was dried at 75° C., resulting in a film having no tack.

TABLE 2

Summary of amounts of reactants in EX-1 to EX-5 and CE-1 to CE-3

| Sample | IPDI, grams | VORANOL 220-056N, grams | MPD, grams | DBTDA, grams | TMP, grams |
|---|---|---|---|---|---|
| EX-1 | 4.33 | 30.0 | 0 | 0 | 0.40 |
| EX-2 | 4.50 | 30.0 | 0 | 0 | 0.46 |
| EX-3 | 7.33 | 30.0 | 1.77 | 0 | 0.26 |
| EX-4 | 8.53 | 30.0 | 2.34 | 0 | 0.35 |
| EX-5 | 3.50 | 30.0 | 0 | 0.01 | 0.067 |
| CE-1 | 3.33 | 30.0 | 0 | 0 | 0 |
| CE-2 | 5.0 | 30.0 | 0 | 0.01 | 0.067 |
| CE-3 | 9.83 | 30.0 | 2.30 | 0.01 | 0.87 |

ND—not determined

TABLE 3

Glass Transition Temperatures (Tg) and Adhesive Shear Moduli (G')

| Examples | Tg, ° C. | G' at −25° C. dyne/cm$^2$ ×10$^5$ | G' at 0° C. dyne/cm$^2$ ×10$^5$ | G' at 25° C. dyne/cm$^2$ ×10$^5$ | G' at 50° C. dyne/cm$^2$ ×10$^5$ | G' at 75° C. dyne/cm$^2$ ×10$^5$ | G' at 100° C. dyne/cm$^2$ ×10$^5$ |
|---|---|---|---|---|---|---|---|
| EX-1 | −48.0 | 830 | 45 | 23.5 | 11.3 | 6.29 | 3.81 |
| EX-2 | −39.4 | 180 | 51.8 | 22.7 | 7.06 | 1.53 | 0.31 |
| EX-3 | −47.7 | 610 | 35.9 | 19.8 | 11.2 | 7.15 | 5.05 |
| EX-4 | −33.4 | 3400 | 61.8 | 25.5 | 7.75 | 1.6 | 0.27 |

TABLE 4

Initial Visual Appearance and Clarity

| Test Method | EX-1 | EX-2 | EX-3 | EX-4 |
|---|---|---|---|---|
| Gloss 60° | 91.8 | 92.1 | 91.3 | 90.8 |
| Initial color | ΔE = 0.50 | ΔE = 0.52 | ΔE = 0.54 | ΔE = 0.54 |
|  | ΔL = −0.18 | ΔL = −0.19 | ΔL = −0.22 | ΔL = −0.20 |
|  | Δa = −0.13 | Δa = −0.13 | Δa = −0.13 | Δa = −0.13 |
|  | Δb = 0.45 | Δb = 0.47 | Δb = 0.48 | Δb = 0.48 |
| Haze value, % | 1.37% | 1.13% | 0.95% | 1.05% |

TABLE 5

Visual Appearance after IPA/water wet application (no blistering or bubbles)

| EX-1 | EX-2 | EX-3 | EX-4 |
|---|---|---|---|
| Pass | Pass | Pass | Pass |

TABLE 6

180 degree peel adhesion results, values reported in Newtons per meter (N/m)

| Test | Conditions | EX-1 | EX-2 | EX-3 | EX-4 |
|---|---|---|---|---|---|
| Initial State | 1 hour @RT, 500 N/m | 714.41 | 630.61 | 990.02 | 820.34 |
| Normal State | 24 hrs @RT, 700 N/m | 889.11 | 990.04 | 1150.10 | 1201.51 |
| RT Aged | 168 hrs @RT, 700 N/m | 953.46 | 949.00 | 1100.40 | 1197.76 |
| Low Temperature Normal State | 168 hrs @−30° C., 700 N/m | 913.84 | 945.05 | 1154.06 | 1225.42 |
| After 100/100 Humidity | 168 hrs, 700 N/m | 1030.20 | 978.29 | 890.77 | 1251.28 |
| After heat Aged | 168 hrs @80° C., 700 N/m | 1095.15 | 989.13 | 1416.92 | 1420.55 |
| After water Immersion | 168 hrs in 40° C. water, 700 N/m | 1045.70 | 970.89 | 925.34 | 1366.90 |

TABLE 7

Gravel Resistance

| Test | Conditions | EX-1 | EX-2 | EX-3 | EX-4 |
|---|---|---|---|---|---|
| Gravelometer (SAE J400) | −20° C., 90° angle, 58 psi (~400 kPa), 350 mm distance | Pass | Pass | Pass | Pass |

TABLE 8

Solvent/Chemical Resistance

| Test | Conditions | EX-1 | EX-2 | EX-3 | EX-4 |
|---|---|---|---|---|---|
| Kerosene | 30 minute immersion, visual | Pass | Pass | Pass | Pass |
| Window Washer Fluid | 30 minute immersion, visual | Pass | Pass | Pass | Pass |
| Gasoline | 30 minute immersion, visual | Pass | Pass | Pass | Pass |

TABLE 9

Environmental Aging Tests

| Test | Requirements | EX-1 | EX-2 | EX-3 | EX-4 |
|---|---|---|---|---|---|
| 7 Days Heat Aging | Shall show no visible change in color or gloss, no blistering or cloudiness | $\Delta E = 0.42$<br>$\Delta L = -0.28$<br>$\Delta a = -0.07$<br>$\Delta b = 0.31$ | $\Delta E = 0.18$<br>$\Delta L = -0.17$<br>$\Delta a = -0.03$<br>$\Delta b = 0.06$ | $\Delta E = 0.32$<br>$\Delta L = -0.26$<br>$\Delta a = -0.03$<br>$\Delta b = 0.20$ | $\Delta E = 0.23$<br>$\Delta L = -0.16$<br>$\Delta a = -0.04$<br>$\Delta b = 0.16$ |
| Heat Aged, 2 weeks at 80° C. | Shall show no visible change in color or gloss, no blistering or cloudiness | $\Delta E = 0.66$<br>$\Delta L = -0.33$<br>$\Delta a = -0.10$<br>$\Delta b = 0.58$ | $\Delta E = 0.33$<br>$\Delta L = -0.21$<br>$\Delta a = -0.07$<br>$\Delta b = 0.25$ | $\Delta E = 0.41$<br>$\Delta L = -0.20$<br>$\Delta a = -0.09$<br>$\Delta b = 0.34$ | $\Delta E = 0.47$<br>$\Delta L = -0.22$<br>$\Delta a = -0.08$<br>$\Delta b = 0.41$ |
| 7 Days 100/100 Condensing Humidity | Shall show no visible change in color or gloss, no blistering or cloudiness | $\Delta E = 0.21$<br>$\Delta L = -0.20$<br>$\Delta a = 0.03$<br>$\Delta b = -0.05$ | $\Delta E = 0.16$<br>$\Delta L = -0.10$<br>$\Delta a = 0.06$<br>$\Delta b = -0.11$ | $\Delta E = 0.23$<br>$\Delta L = -0.22$<br>$\Delta a = 0.05$<br>$\Delta b = -0.04$ | $\Delta E = 0.22$<br>$\Delta L = -0.21$<br>$\Delta a = 0.04$<br>$\Delta b = -0.05$ |
| Thermal Cycle | Shall show no visible change in color or change, no blistering or cloudiness | $\Delta E = 0.24$<br>$\Delta L = -0.24$<br>$\Delta a = 0.00$<br>$\Delta b = -0.05$ | $\Delta E = 0.19$<br>$\Delta L = -0.09$<br>$\Delta a = -0.01$<br>$\Delta b = 0.19$ | $\Delta E = 0.09$<br>$\Delta L = -0.06$<br>$\Delta a = -0.02$<br>$\Delta b = -0.05$ | $\Delta E = 0.13$<br>$\Delta L = -0.162$<br>$\Delta a = -0.02$<br>$\Delta b = 0.03$ |
| 7 Days Water Immersion at 40° C. | Shall show no visible change in color or gloss, no blistering or cloudiness | $\Delta E = 0.38$<br>$\Delta L = -0.29$<br>$\Delta a = -0.06$<br>$\Delta b = -0.23$ | $\Delta E = 0.33$<br>$\Delta L = -0.27$<br>$\Delta a = -0.03$<br>$\Delta b = 0.19$ | $\Delta E = 0.43$<br>$\Delta L = -0.35$<br>$\Delta a = -0.05$<br>$\Delta b = 0.25$ | $\Delta E = 0.38$<br>$\Delta L = -0.23$<br>$\Delta a = -0.06$<br>$\Delta b = 0.29$ |

While the specification has described in detail certain exemplary embodiments, it will be appreciated that those skilled in the art, upon attaining an understanding of the foregoing, may readily conceive of alterations to, variations of, and equivalents to these embodiments. Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. A pressure-sensitive adhesive comprising the crosslinked composition of a crosslinkable composition comprising:
   (a) 40 mole percent to 55 mole percent of an asymmetric isocyanate, based on total moles of crosslinkable components in the crosslinkable composition;
   (b) a polypropylene polyol;
   (c) a crosslinker comprising 1,2,6-hexanetriol, glycerol, 1,1,1-trimethylolethane, 1,1,1-trimethylolpropane (TMP), pentaerythritol, triisopropanol amine, triethanol amine, a TMP initiated branched adipate polyol, a TMP initiated branched phthalate polyol, a glycerol initiated branched adipate polyol, or a glycerol initiated branched phthalate polyol; and
   (d) 10 mole percent to 40 mole percent of a chain extender, based on total moles of crosslinkable components in the crosslinkable composition;
   wherein the polypropylene polyol and the crosslinker are present in an amount of 45 mole percent to 60 mole percent of the total OH groups of the crosslinkable composition; and wherein the crosslinkable composition has an amorphous structure.

2. The pressure-sensitive adhesive of claim 1, wherein the isocyanate comprises 1-isocyanatomethyl-3-isocyanato-1,5,5-trimethylcyclohexane (isophorone diisocyanate), 1,3-bis(2-isocyanatopropan-2-yl)benzene (tetramethylxylene diisocyanate), 1-methyl-2,4-diisocyanatocyclohexane, 1,6-diisocyanato-2,2,4-trimethylhexane, 1,6-diisocyanato-2,4,4-trimethylhexane, 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-1-(4-isocyanatobut-1-yl)-1,3,3-trimethylcyclohexane, 1-isocyanato-2-(3-isocyanatoprop-1-yl)cyclohexane, 1-isocyanato-2-(2-isocyanatoeth-1-yl)cyclohexane, dicyclohexylmethane 2,4'-diisocyanate, 2-heptyl-3,4-bis(9-isocyanatononyl)-1-pentylcyclohexane, ethylethylene diisocyanate, or a combination thereof.

3. The pressure-sensitive adhesive of claim 1, wherein the isocyanate comprises a chlorinated diisocyanate, a brominated diisocyanate, a sulphur-containing diisocyanate, a phosphorus-containing diisocyanate, or a combination thereof.

4. The pressure-sensitive adhesive of claim 1, wherein the isocyanate comprises isophorone diisocyanate, tetramethylxylene diisocyanate, or a combination thereof.

5. The pressure-sensitive adhesive of claim 1, wherein the chain extender comprises 3-methyl-1,5-pentanediol, 1,4-butanediol, ethylene glycol, diethylene glycol, dipropylene glycol, neopentyl glycol, 1,6-hexanediol, 1,4-cyclohexane dimethanol, bis(2-hydroxylethyl)hydroquinone (HQEE), or a combination thereof.

6. The pressure-sensitive adhesive of claim 1, wherein the crosslinker is present in an amount of 1 mole percent to 35 mole percent of the OH groups of the crosslinkable composition.

7. The pressure-sensitive adhesive of claim 1, wherein the crosslinker comprises TMP.

8. The pressure-sensitive adhesive of claim 1, comprising 1.0 mole percent to 40 mole percent of the polypropylene polyol.

9. The pressure-sensitive adhesive of claim 1, wherein the polypropylene polyol has an average molecular weight of about 1,000 grams/mole to 5,000 grams/mole.

10. The pressure-sensitive adhesive of claim 1, wherein the adhesive has a haze of less than 2%.

11. The pressure-sensitive adhesive of claim 1, wherein the adhesive has an adhesive shear modulus at −25° C. of $0.1 \times 10^7$ dyne/cm$^2$ to $20 \times 10^7$ dyne/cm$^2$.

12. An adhesive article comprising the pressure-sensitive adhesive of claim 1 and a flexible backing layer.

13. The pressure-sensitive adhesive of claim 1, wherein the chain extender has a molecular weight of 400 grams or less.

14. The pressure-sensitive adhesive of claim 1, wherein the polypropylene polyol is a polypropylene glycol.

* * * * *

UNITED STATES PATENT AND TRADEMARK OFFICE
CERTIFICATE OF CORRECTION

PATENT NO. : 10,611,873 B2
APPLICATION NO. : 15/535790
DATED : April 7, 2020
INVENTOR(S) : Yongshang Lu Page 1 of 1

It is certified that error appears in the above-identified patent and that said Letters Patent is hereby corrected as shown below:

In the Specification

<u>Column 11</u>,
Line 15, delete "RHEOMETER." and insert -- RHEOMETER, --, therefor.

<u>Column 14</u>,
Line 7, delete "grams)." and insert -- grams), --, therefor.

In the Claims

<u>Column 17</u>,
Line 38, in Claim 1, delete "the" and insert -- a --, therefor.
Line 58, in Claim 1, delete "crosslinkable" and insert -- crosslinked --, therefor.

Signed and Sealed this
Twenty-seventh Day of August, 2024

Katherine Kelly Vidal
*Director of the United States Patent and Trademark Office*